United States Patent [19]
Allen et al.

[11] Patent Number: 5,967,549
[45] Date of Patent: Oct. 19, 1999

[54] CONTROL SYSTEM FOR VEHICLE OCCUPANT RESTRAINT DEVICES

[75] Inventors: Gary S. Allen; Said Shafik Nakhla; Harald Snorre Husby, all of Lakeland, Fla.; Michael P. Murray, Ann Arbor, Mich.; Craig Robert Roble, Cambridge, Wis.

[73] Assignee: Breed Automotive Technology, Inc., Lakeland, Fla.

[21] Appl. No.: 09/025,159

[22] Filed: Feb. 18, 1998

Related U.S. Application Data

[63] Continuation-in-part of application No. 08/804,749, Feb. 21, 1997.

[51] Int. Cl.[6] .................................................... B60R 21/26
[52] U.S. Cl. ...................................... 280/735; 280/730.1
[58] Field of Search .............................. 280/735, 730.1, 280/734

[56] References Cited

U.S. PATENT DOCUMENTS

| | | | |
|---|---|---|---|
| 4,625,329 | 11/1986 | Ishikawa et al. ........................... | 382/1 |
| 4,811,226 | 3/1989 | Shinohara .......................... | 364/424.05 |
| 5,000,505 | 3/1991 | Kawashita et al. ..................... | 296/65.1 |
| 5,074,583 | 12/1991 | Fujita et al. .............................. | 280/735 |
| 5,398,185 | 3/1995 | Omura ..................................... | 280/735 |
| 5,413,378 | 5/1995 | Steffens, Jr. et al. .................... | 280/735 |
| 5,482,314 | 1/1996 | Corrado et al. ......................... | 280/735 |
| 5,707,110 | 1/1998 | Campbell et al. .................... | 297/344.1 |

*Primary Examiner*—Kenneth R. Rice
*Attorney, Agent, or Firm*—L. Drayer

[57] ABSTRACT

A vehicle occupant restraint device control system for use in a vehicle to selectively control the operation of safety devices such as one or more airbags includes a seat position sensor device which detects the position of a seat relative to a selected component of the vehicle, and a controller which receives signals from the seat position sensor device. A controller device processes the signals from the seat position sensor device and determines whether to activate, deactivate or modify the deployment of one or more vehicle occupant restraint devices, such as airbags or seat belt pretensioners, depending upon the position of the vehicle seat relative to a selected component of the vehicle structure, such as the steering wheel or instrument panel.

22 Claims, 12 Drawing Sheets

CONTROL SYSTEM FOR VEHICLE OCCUPANT RESTRAINT DEVICES

This is a Continuation-in-part of application Ser. No. 08/804,749 filed Feb. 21, 1997.

The present invention relates to a control system which detects the position of a vehicle seat and uses this information to control the operation of vehicle occupant restraint devices, such as an airbag, depending upon the position of the seat relative to a selected vehicle component, such as a vehicle occupant restraint device.

Injuries in motor vehicle accidents have been substantially reduced through the use of vehicle occupant restraint devices. When a motor vehicle is subjected to a sudden deceleration of a predetermined value, vehicle occupant restraint devices are activated to cushion the occupants, and restrain their movement with respect to the vehicle structure. The term "vehicle occupant" is understood to include the driver of a vehicle as well as passengers. The term "vehicle occupant restraint device" is understood to include: (a) airbags stored, for example, in the steering wheel or instrument panel of a vehicle; (b) seat belts and related devices such as pretensioners; (c) side curtains; and (d) other devices which retrain a vehicle occupant from impacting with the vehicle structure in the event of a crash.

DESCRIPTION OF THE PRIOR ART

U.S. Pat. No. 5,482,314 teaches a system for sensing the presence, position and profile of occupants in a passenger seat of a vehicle, as well as for sensing the presence of a rear-facing child seat therein, for use in enabling or disabling a related airbag activator. The sensor employs sensor-fusion, a process of combining information provided by two or more sensors, each of which "sees" the world in a unique sense. The occupancy sensor samples two detectable properties, a first being a thermal signature and associated motion, and a second is acoustically measured distance and the associated motion. Infrared sensor inputs and an ultrasonic sensor input are combined in a microprocessor circuit by means of a sensor fusion algorithm to produce an output signal to the airbag controller. The output signal results from preselected confidence weighing for feature parameters generated by the two sensors and upon a fusion process which ultimately makes a decision. The sensor fusion matrix processes the sensor outputs in a decision making operation which includes weighing inputs to guarantee reliability. All sensor outputs, along with calibration data, initial conditions and historical reference data are considered in the process of making a decision of whether or not to deploy the passenger side airbag in a crash.

U.S. Pat. No. 5,000,505 teaches a rotary device for front seats of a motor vehicle which enables both a driver seat and a front passenger seat to be rotatably capable of taking an ordinary forwardly facing position and a rearwardly facing position. The device includes a first detection switch provided in the driver seat for electrically detecting the position of the driver seat, a second detection switch provided in the passenger seat for electrically detecting the position of the passenger seat, a first rotation control provided in the driver seat for preventing or permitting the operation of a rotation release lever of the driver seat, and a second rotation control provided in the passenger seat for preventing or permitting the operation of the other rotation release lever of the passenger seat. A control system electrically controls the first and the second rotation controls by receiving signals from the first and second detection switches so as to prevent a condition such that the driver seat is in the forwardly facing position but the passenger seat is in the rearwardly facing position.

U.S. Pat. No. 4,811,226 teaches an automatic angle adjusting apparatus for optimally adjusting vehicle equipment to a driver such as a fender mirror, an inner mirror, blowing ports of an air conditioner, a speaker and a meter. Amounts of adjustment of vehicle seat parts are detected by amounts of adjustment detectors and the optimum angles of the vehicle equipments, the height of the driver or an eye position of the driver are calculated based on the detection signals to automatically adjust the vehicle equipment to the optimum angular position. When the height or the eye position of the driver is calculated, the optimum angles are further calculated based on the calculated height or eye position.

U.S. Pat. No. 4,625,329 teaches an image analyzer for analyzing the position of a vehicle driver in a three dimensional coordinate system. The analyzer comprises a light emitting element for emitting an infrared light on the driver's face portion and an image detector arranged to receive reflected infrared light to generate an optical image of the driver's face portion. A microcomputer includes a memory for storing an electronic image corresponding to the optical image and processes the stored image to determine the position of a facial feature of the driver, such as an eye, in a three dimensional coordinate system.

Position indicating data is utilized for controlling the angular position of a rearview mirror, the angular position of a steering wheel, the angular and height positions of a head rest, the direction of air directed from an air conditioner, and the position of data to be displayed on a display means.

DETAILED DESCRIPTION OF THE INVENTION

Figure 1:
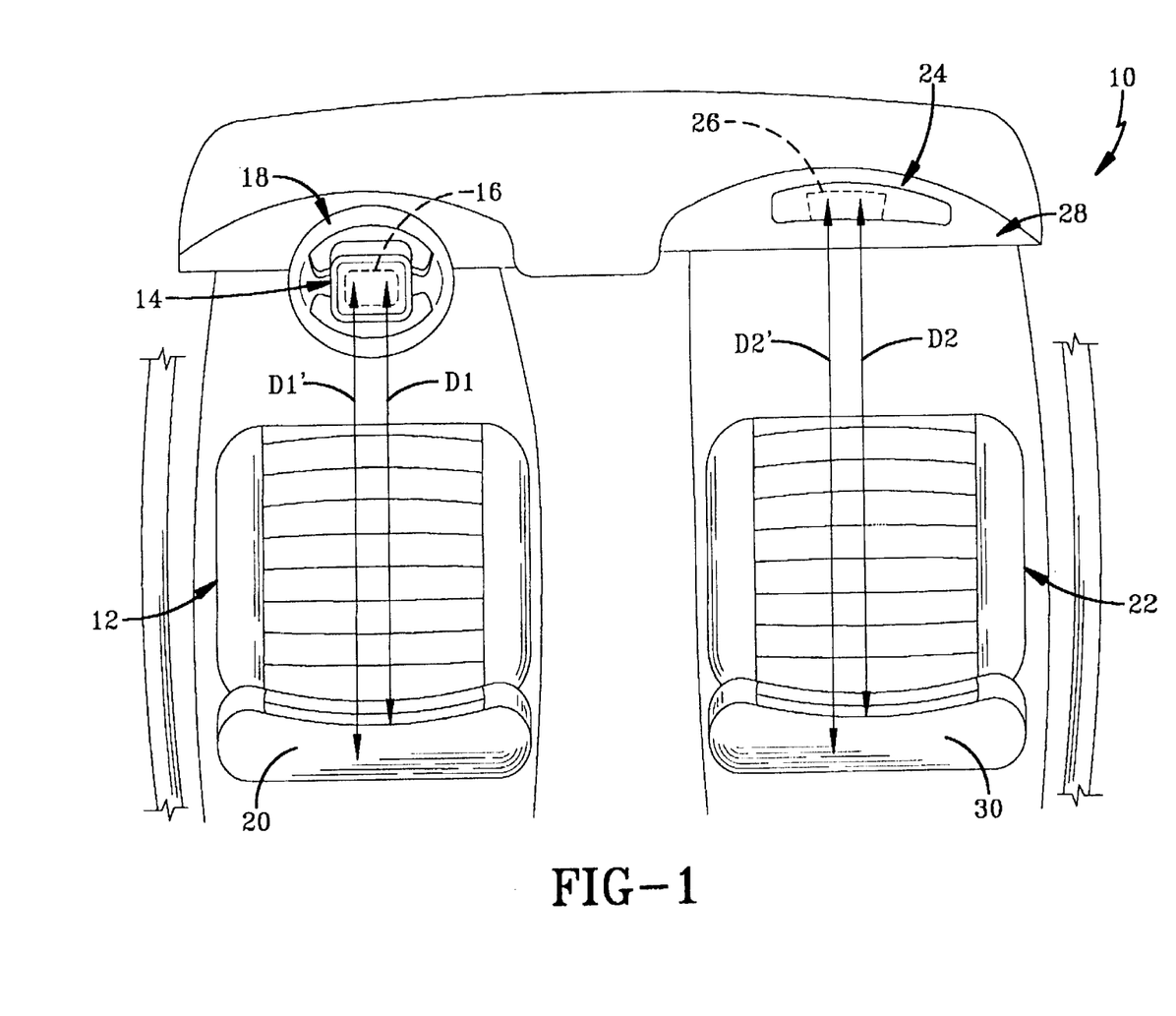
FIG. 1 presents an overhead view of the front seat portion of the passenger compartment of a vehicle.

With reference to FIG. 1, which presents an overhead view of the front portion of a passenger compartment of a vehicle 10, the present invention relates to a vehicle occupant restraint device control system which includes a device to detect the position of a seat 12, 22 relative to a selected vehicle component, such as a vehicle occupant restraint device 14, 24, and means to generate at least one control signal to enable, inhibit and/or impart selected operating characteristics to a vehicle occupant restraint device 14, 24. The vehicle occupant restraint device which is being controlled may be, for example, a driver's side airbag 16 stored in the steering wheel 18 or a front passenger's side airbag 26 stored in the instrument panel 28. It is understood that the vehicle occupant restraint device control system of the present invention may be used to control other vehicle occupant restraint devices such as side impact airbags, seat belt pretensioners, and the like.

When the control vehicle occupant restraint device system of the present invention senses that a selected component of a vehicle, such as the driver's side airbag module 14, is in a predetermined range of distances from a selected portion of a vehicle seat the controller generates one or more control signals to enable, inhibit and/or impart selected operating characteristics to a vehicle occupant restraint device, such as the front driver's side airbag module 14. As used herein and in the claims the term "airbag module" is understood to the mean an assembly comprising at least an airbag and the structure to which the airbag is mounted, but an airbag module may further include an inflation device, and/or airbag cover.

Figure 2:
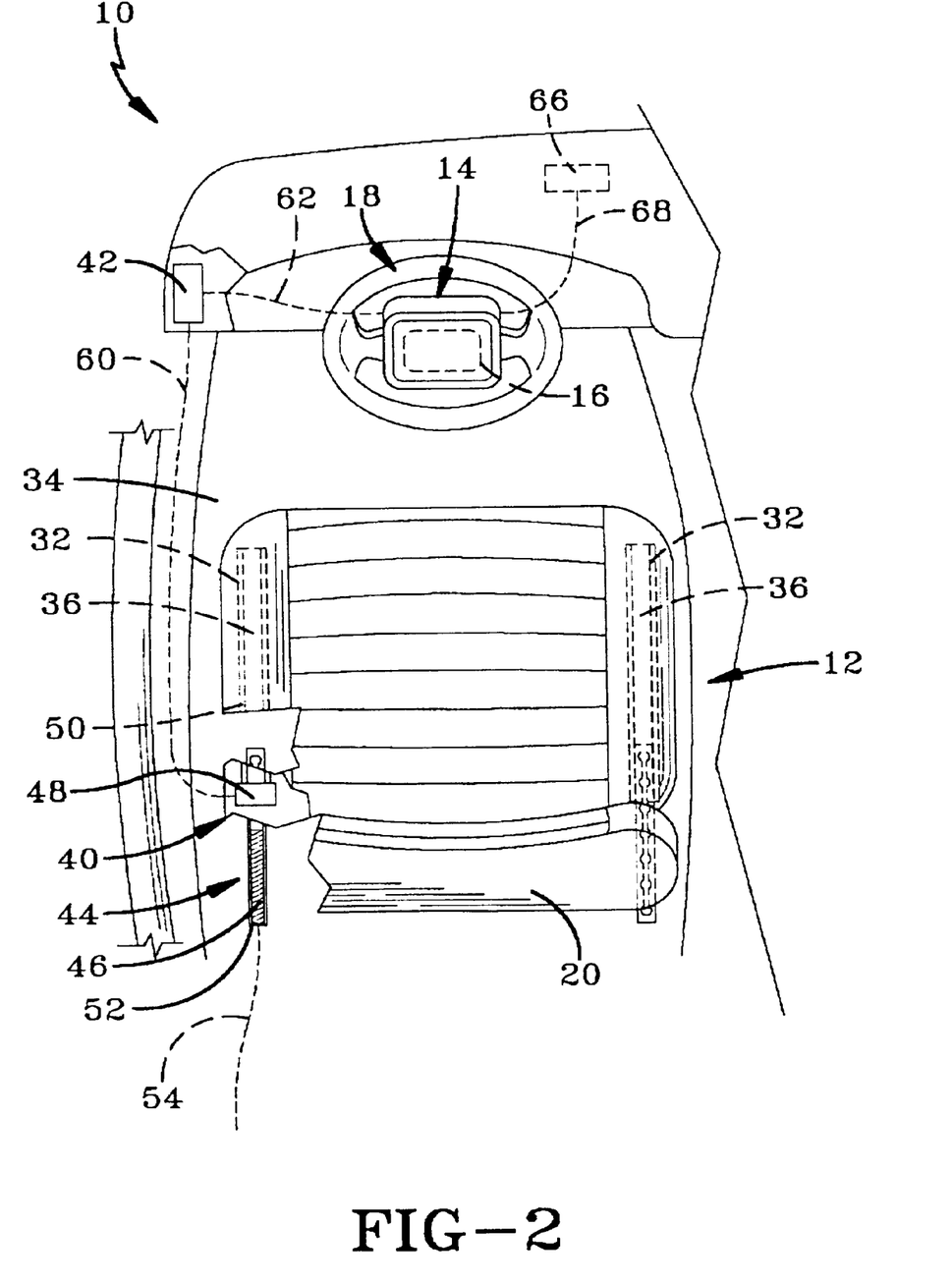
FIG. 2 presents an overhead view of the vehicle occupant restraint device control system of the present invention on the driver's side with two seat position sensing zones.
Figure 3:
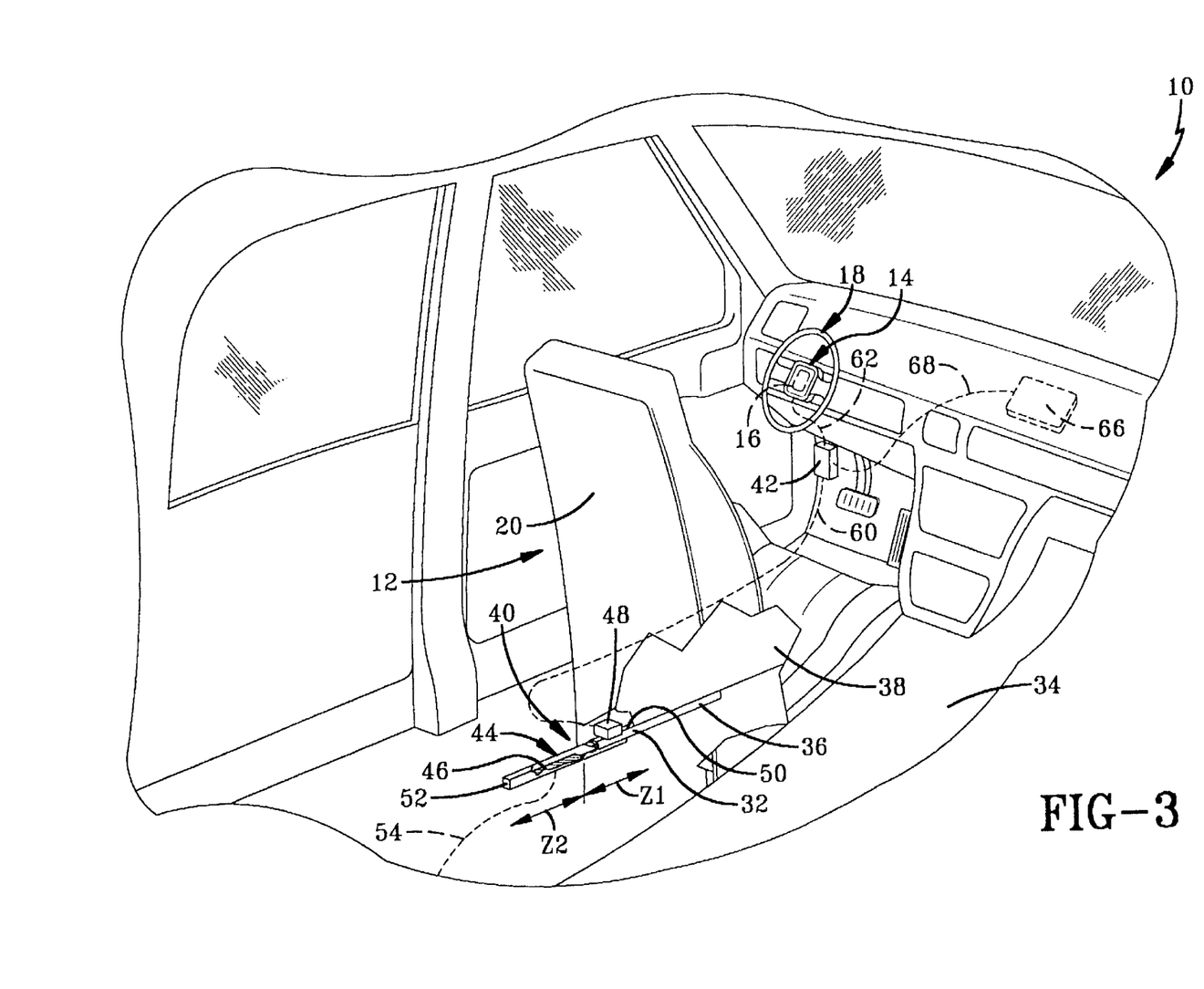
FIG. 3 presents a perspective view of the vehicle occupant restraint device control system of the present invention on the driver's side as shown in FIG. 2.

As shown in FIGS. 2 and 3, the driver's seat 12 is slidably mounted on a pair of substantially parallel guide tracks 32 affixed to the floor 34 of the vehicle 10 by a corresponding pair of substantially parallel support rails 36 attached to the lower portion, or bottom 38, of the driver's seat such that the driver's seat is movable relative to the steering wheel 18, and the driver's side airbag module 14 to accommodate drivers of different statures.

As shown in FIGS. 1, 2 and 3, the vehicle occupant restraint device control system comprises a seat position sensor device 40 operatively coupled to the driver's side airbag module 14 through a controller 42 to detect the position of a selected portion of the driver's seat 12 relative to a selected vehicle component, such as the driver's side airbag module 14, and to generate a seat position indicator signal when the distance D1 therebetween is in a predetermined range of distances, to enable, inhibit and/or impart selected operating characteristics to a vehicle occupant restraint device, such as the driver's side airbag 16, in the event that a crash of the vehicle of a predetermined severity is detected by a crash sensor 66.

As shown in FIGS. 2 and 3, the seat position sensor device 40 comprises a magnetic actuator 44 operatively coupled to a selected portion, in this example the rear portion 46, of at least one of the guide tracks 32. A first device 48 which is responsive to a magnetic field is attached to a selected location, in this example the rear portion 50, of the corresponding support rail 36 such that when the driver's seat 12 is moved along the guide tracks the first device 48 which is responsive to a magnetic field is moved relative to the magnetic actuator 44.

The magnetic actuator 44 comprises an element which creates a magnetic field such as a magnetic strip 52 or similar magnetic device, which in the case of an electromagnet is connected to a power source (not shown) by a conductor 54. The first device 48 which is responsive to a magnetic field comprises a reed switch, Hall Effect sensor, GMR sensor, or similar device such that when the device 48 which is responsive to a magnetic field is moved into operative relationship relative to the magnetic actuator 44, the device which is responsive to a magnetic field generates a seat position indicator signal which is transmitted to the controller 42 through a conductor 60.

As previously set forth, the magnetic actuator 44 is located on the rear portion 46 of at least one of the guide tracks 32 such that when the distance D1 (see FIG. 1) between a selected component of the vehicle, such as the driver's side airbag module 14, and a selected portion of a seat, such as the driver's backrest 20, is in a predetermined range of values, the first device 48 which is responsive to a magnetic field is disposed in region Z1 (see FIG. 3) and not operatively disposed relative to the magnetic actuator 44, thereby generating a first seat position indicator signal; when the distance D1 between the driver's side airbag module 14 and the driver's backrest 20 is in a predetermined range of distances, the first device 48 which is responsive to a magnetic field is disposed in region Z2 and is operatively disposed or aligned relative to the magnetic actuator 44 to generate a second seat position indicator signal that is transmitted to the controller 42. It is understood that the seat position signals may be the result of an open circuit or closed circuit, or may be signals of varying intensity, frequency or duration.

The controller 42 comprises circuitry to receive the seat position indicator signal generated by the seat position sensor device 40 when the distance D1 between the driver's side airbag module 14 and the driver's backrest 20 is in a predetermined range of distances, and to generate a control signal transmitted to a vehicle occupant restraint device, such as the driver's side airbag module 14 through a conductor 62 to enable, inhibit and/or impart selected operating characteristics to a vehicle occupant restraint device, such as the driver's side airbag 16.

The front passenger's side may be similarly equipped with a vehicle occupant restraint device control system to enable, inhibit and/or impart selected operating characteristics to one or more vehicle occupant restraint devices, such as the front passenger's side airbag 26, relative to the distance D2, D2' (see FIG. 1) between a selected component of the vehicle and a selected portion of the vehicle seat.

Figure 4:
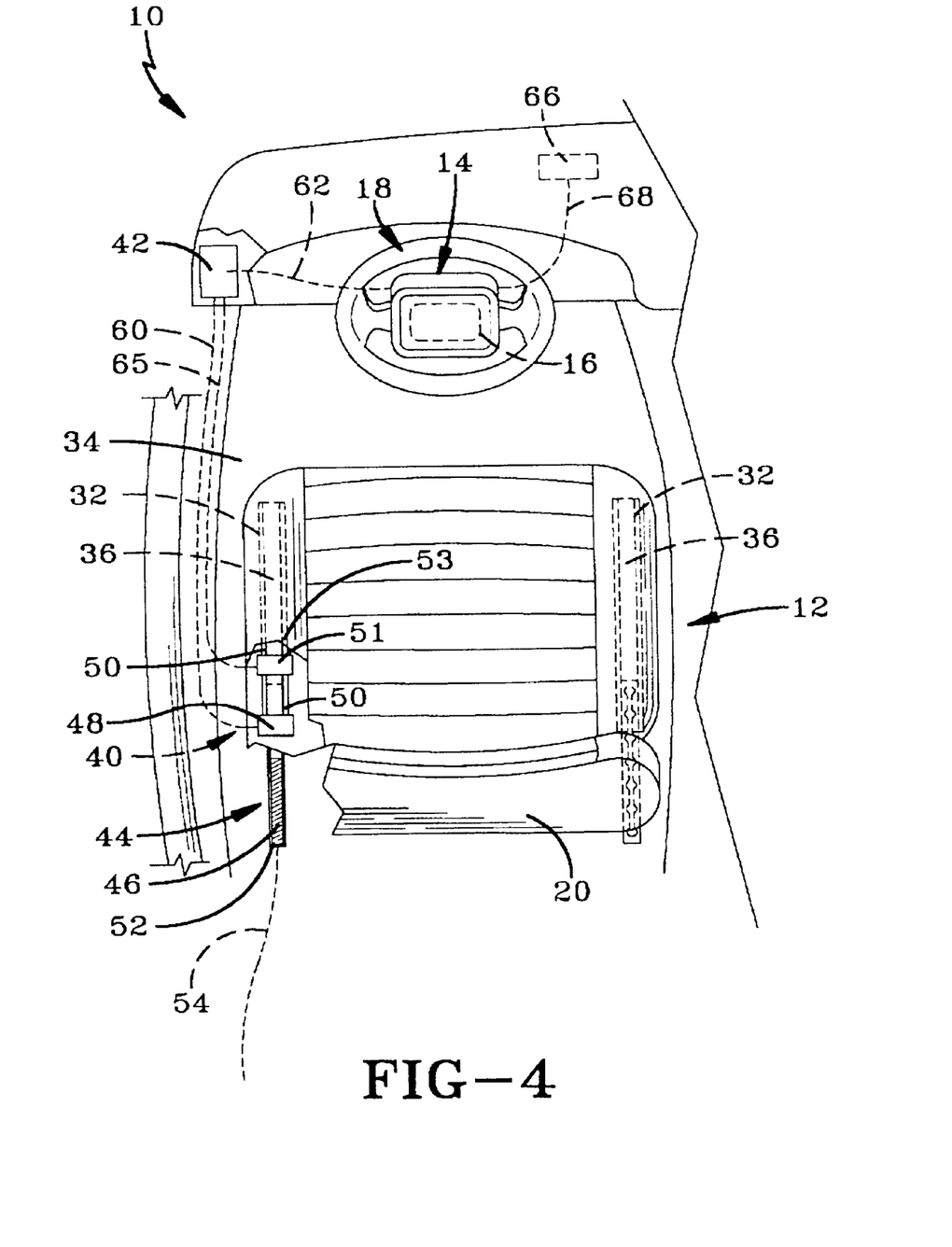
FIG. 4 presents an overhead view of the vehicle occupant restraint device control system of the present invention on the driver's side with three seat position sensing zones.
Figure 5:
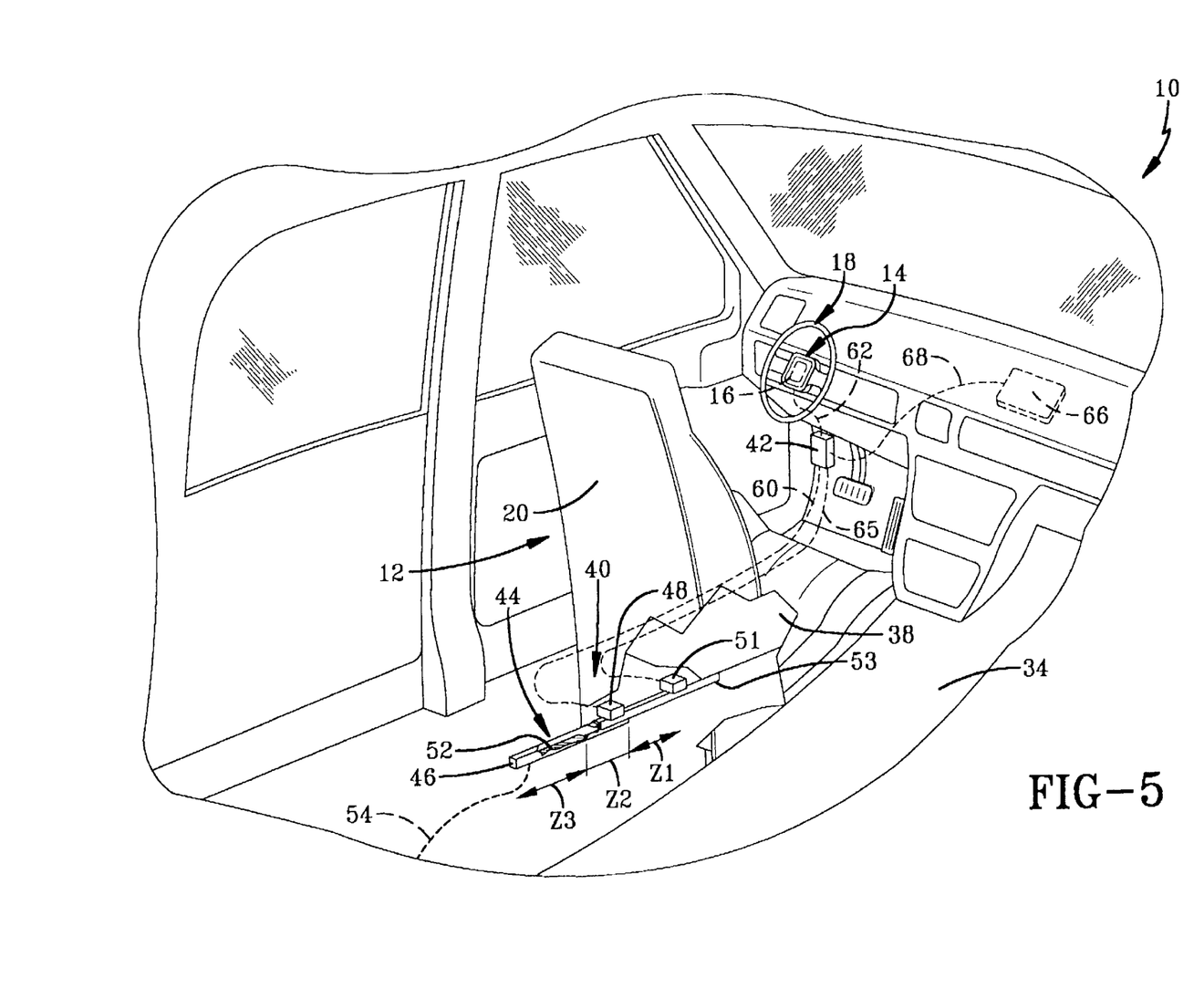
FIG. 5 presents a perspective view of the vehicle occupant restraint device control system of the present invention on the driver's side as shown in FIG. 4.

FIGS. 4 and 5 show an alternate embodiment of the present invention similar to that of the vehicle occupant restraint device control system shown in FIGS. 2 and 3 for use with three seat position sensing zones Z1, Z2 and Z3. Specifically, the driver's seat 12 is slidably mounted on a pair of substantially parallel guide tracks 32 affixed to the floor 34 of the vehicle 10 by a corresponding pair of substantially parallel support rails 36 attached to the lower portion or bottom 38 of the driver's seat 12 such that the driver's seat 12 is adjustable relative to the steering wheel 18 and driver's side airbag module 14 to accommodate drivers of different statures.

As shown in FIGS. 4 and 5, the vehicle occupant restraint device control system comprises a seat position sensor device 40 operatively coupled to the driver's side airbag module 14 through a controller 42 to detect the position of a selected portion of the driver's seat 12 relative to a selected vehicle component, such as the driver's side airbag module 14, and to generate a first seat position indicator signal when the distance D1 (see FIG. 1) therebetween is in a first predetermined range of distances and less than a second distance D1' which is in a second predetermined range of distances predetermined to enable, inhibit and/or impart selected operating characteristics to a vehicle occupant restraint device, such as the deployment of the driver's side airbag 16 in the event that a crash of the vehicle 10 of a predetermined severity is detected by a crash sensor, and to generate a second seat position indicator signal when the distance D1' between the driver's seat 12 and the driver's side airbag module 14 is in a second predetermined range of distances, to enable, inhibit and/or impart selected operating characteristics to a vehicle occupant restraint device, such as deployment of the driver's side airbag 16 in the event that a crash of the vehicle 10 of a predetermined severity is detected by a crash sensor. For example the controller may determine whether or not the airbag is to be deployed, the timing of the deployment, or even the volume of gas used to deploy an airbag. In making such a determination the controller may also take into account other factors such as vehicle occupant size, and crash severity, or may simply take into account the seat position signal.

As shown in FIGS. 4 and 5, the seat position sensor device 40 comprises a magnetic actuator 44 operatively coupled to the rear portion 46 of one of the guide tracks 32 and a first device 48 which is responsive to a magnetic field is attached to the rear portion 50 of the corresponding support rail 36 and a second device 51 which is responsive to a magnetic field is attached to the mid-portion 53 of the corresponding support rail 36 such that when the driver's seat 12 is moved along the guide tracks 32 the first device 48 which is responsive to a magnetic field and the second device 51 which is responsive to a magnetic field are moved relative to the magnetic actuator 44.

The magnetic actuator 44 comprises an element which creates a magnetic field such as a magnetic strip 52 or similar magnetic device, which in the case of an electromagnet is connected to a power source (not shown) by a conductor; while, the first and second devices 48,51 which are responsive to a magnetic field comprise a reed switch, Hall Effect sensor, GMR sensor, or similar device such that when the first device 48 which is responsive to a magnetic field is moved into operative relationship relative to the magnetic actuator 44, the seat position sensor device 40 generates a first seat position indicator signal transmitted to the controller 42 through a conductor 60 and when the second device 51 which is responsive to a magnetic field is moved into operative relationship relative to the magnetic actuator 44 the device 48 which is responsive to a magnetic field generates a second seat position indicator signal transmitted to the controller 42 through a conductor 65. It is understood that the seat position signals may be the result of an open circuit or closed circuit, or may be signals of varying intensity, frequency or duration.

As previously set forth, the magnetic actuator 44 is located on the rear portion 46 of at least one of the guide tracks 32 such that when the distance D1 between the driver's side airbag module 14 and the driver's backrest 20 is in a predetermined range of values, the first device 48 which is responsive to a magnetic field is disposed in zone Z1 and not operatively disposed relative to the magnetic actuator 44, thereby generating a first seat position indicator signal. When the distance D1 between the driver's side airbag module 14 and the driver's backrest 20 is in a first predetermined range of distances but less than distance D1' which is in a second predetermined range of distances, the first device 48 which is responsive to a magnetic field is disposed in zone Z2 and operatively disposed or aligned relative to the magnetic actuator 44 to generate a second seat position indicator signal that is transmitted to the controller 42. When the distance D1' between the driver's side airbag module 14 and driver's backrest 20 is in a second predetermined range of distances, the second device 51 which is responsive to a magnetic field is disposed in zone Z3 and operatively disposed or aligned relative to the magnetic actuator 44 to generate a third seat position indicator signal that is transmitted to the controller 42. It is understood that the seat position signals may be the result of an open circuit or closed circuit, or may be signals of varying intensity, frequency or duration.

The controller 42 comprises circuitry for receiving the first seat position indicator signal generated by the seat position sensor device 40 when the distance D1 between the driver's side airbag module 14 and the driver's backrest 20 is in a first selected range of distances but less than distance D1' which is in second predetermined range of distances, to generate a first control enable signal transmitted to the driver's side airbag module 14 through a conductor 62 to enable, inhibit and/or impart selected operating characteristics to a vehicle occupant restraint device, such as the deployment of the driver's side airbag 16. The controller 42 further comprises circuitry including circuitry for receiving the second seat position indicator signal generated by the seat position sensor device 40 when the distance D1 between the driver's side airbag module 14 and the driver's backrest 20 is in a predetermined range of distances, to generate a second control enable signal transmitted to the driver's side airbag module 14 through the conductor 62 to enable, inhibit and/or impart selected operating characteristics to a vehicle occupant restraint device, such as the deployment of the driver's side airbag 16.

The front passenger's side may be similarly equipped with a vehicle occupant restraint device control system to enable, inhibit and/or impart selected operating characteristics to a vehicle occupant restraint device, such as the deployment of the front passenger's side airbag 26, as a function of seat location relative to predetermined ranges of distances.

Figure 6A:
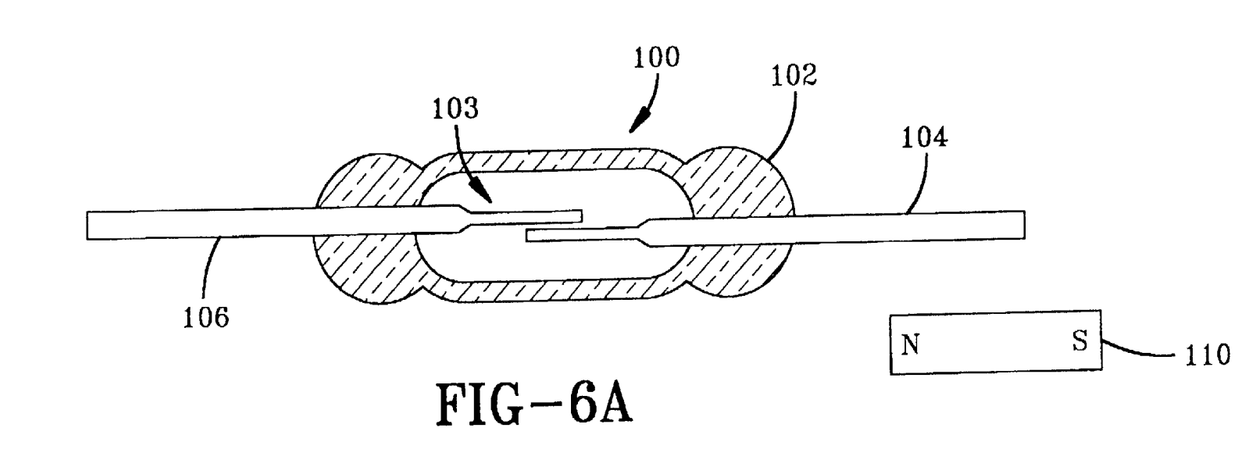
FIGS. 6A and 6B present schematic, cross-sectional side views of a sensor used to provide the seat position indicator signal of the present invention.
Figure 6B:
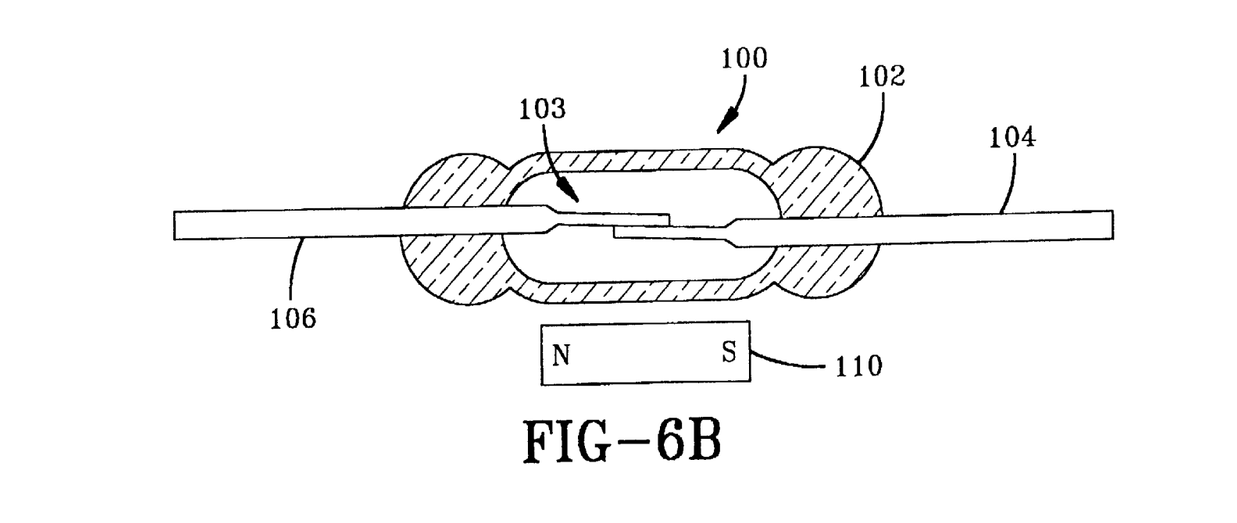

FIGS. 6A and 6B present a schematic, cross-sectional side views illustrating the use of a reed switch 100 which is responsive to a magnetic field to provide seat position indicator signals according to the present invention. The reed switch has a first conductive element 104 and a second conductive element 106. Both of the conductive elements are sealed within a housing 102 having a cavity 103 formed therein. When employed in the present invention, the conductive elements of the reed switch are incorporated in a circuit that communicates with a controller (not shown).

In operation, when not subjected to magnetic flux, as in FIG. 6A, the two conductive elements 104, 106 are spaced apart from one another thereby maintaining a normally open circuit with the controller (not shown). However, as illustrated in FIG. 6B, when the reed switch 100 is acted upon by a source of magnetic flux outside the housing 102, such as a magnet 110 which acts as the magnetic actuator 44 described above (see FIGS. 2 and 3), located along the length of a vehicle seat guide track 32 (see FIGS. 2 and 3), the two conductive elements 104, 106 are magnetically coupled, thus causing a closed circuit with the controller (not shown). It is the closed or open circuit caused by the interaction between the magnetic actuator and the two conductive elements that provides the seat position indicator signals that are transmitted to the controller (not shown) as discussed above. Of course, it is within the scope of the present disclosure to employ a reed switch having normally contacting conductive elements in the practice of the invention.

FIGS. 7A, 7B, 7C and 7D present perspective and cross-sectional views of a vehicle seat position sensor device according to one preferred embodiment of the present invention employing the operation of a reed switch 100 described above with respect to FIGS. 6A and 6B. The magnetic actuator 105, such as a permanent magnet, and the device 100 which is responsive to a magnetic field, in this instance a reed switch, are both situated within a U shaped housing 136. The U shaped housing is made of a material that does not substantially interfere with magnetic flux, most preferably a polymeric material. In this instance, the magnet 105 is located in one leg of the U shaped housing 136 and the reed switch 100 is located in the opposing leg of the U shaped housing. It is understood that the magnetic actuator may be an electromagnet or other device that generates magnetic flux, and that the device which is responsive to a magnetic field may be a Hall Effect sensor or GMR sensor or any other suitable device which is responsive to a magnetic field in a useful manner. The device which is responsive to a magnetic field is connected to a controller (not shown) by suitable conductors (not show). It is further understood that a housing that is not U shaped but has a passageway therethrough to receive therein an elongate member could be used in place of the U shaped housing.

Figures 7A, 7B, 7C, 7D:
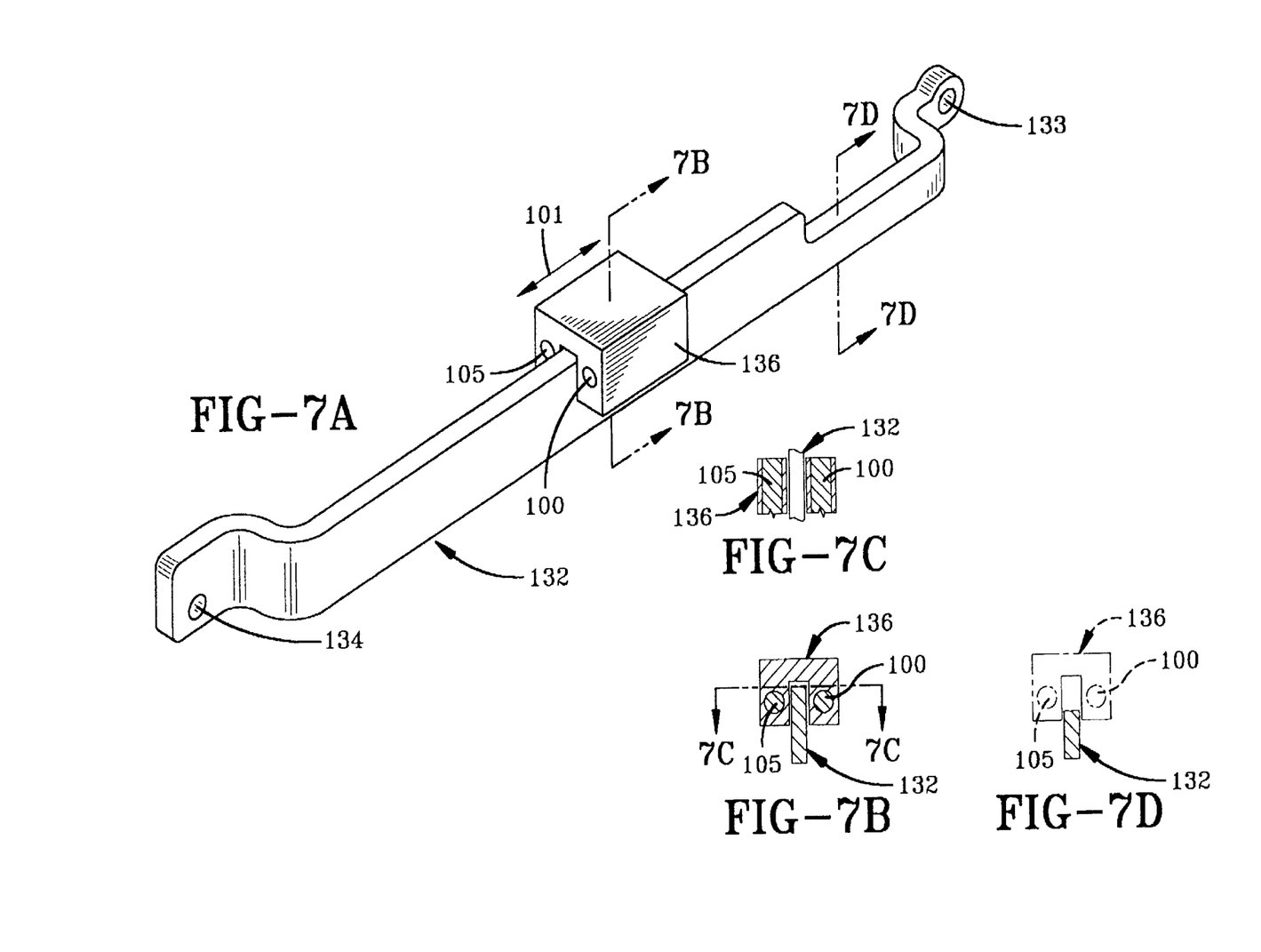
FIGS. 7A, 7B, 7C and 7D present perspective and cross-sectional views of a vehicle seat position sensor device according to one preferred embodiment of the present invention.

An elongated member 132 has openings 133, 134 formed therethrough to allow a fastening means such as a bolt or other device to secure the elongated member to a suitable component of a vehicle seat or the support structure of a vehicle seat or the vehicle floor. The elongated member may be made of any suitable material that will substantially block the passage or severely restrict the passage of electromagnetic flux therethrough, such as a non ferro-magnetic metal. The elongated member is disposed in the slot of the U shaped member. The U shaped housing and the elongated member can move relative to one another in the direction indicated by arrow 101 in FIG. 7A with the elongated member interposed between the magnetic actuator 105 and the reed switch 100. As shown in FIG. 7A, the elongated member 132 is a two-step member, whereby the height along one zone of the elongated member is greater than along another zone of the elongated member.

When the U shaped housing 136 and elongated member 132 are disposed relative to one another at a location in a first zone of the length of the elongated member as shown in FIG. 7A, for example at section line 7B—7B, the situation presented in FIG. 7B arises. As shown in FIG. 7B the elongated member 132 interferes with the electromagnetic flux generated by magnetic actuator 105 so that no response is generated by the reed switch 100 and a first signal is sent to a controller. FIG. 7C is a section view taken along line 7C—7C showing the disposition of the magnetic actuator 105 and reed switch 100 in the U shaped housing 136. FIG. 7D shows a cross section of the U shaped housing 136 and elongated member 132 when they are disposed relative to one another in the zone of the elongated member which has a lesser height, such as the location indicated by section line 7D—7D. At this location, as shown in FIG. 7D the elongated member does not substantially interfere with the electromagnetic flux and the reed switch responds in the manner described above with respect to FIG. 6B to close a circuit with a controller (not shown) and send a second signal to the controller.

Figures 8A, 8B, 8C:
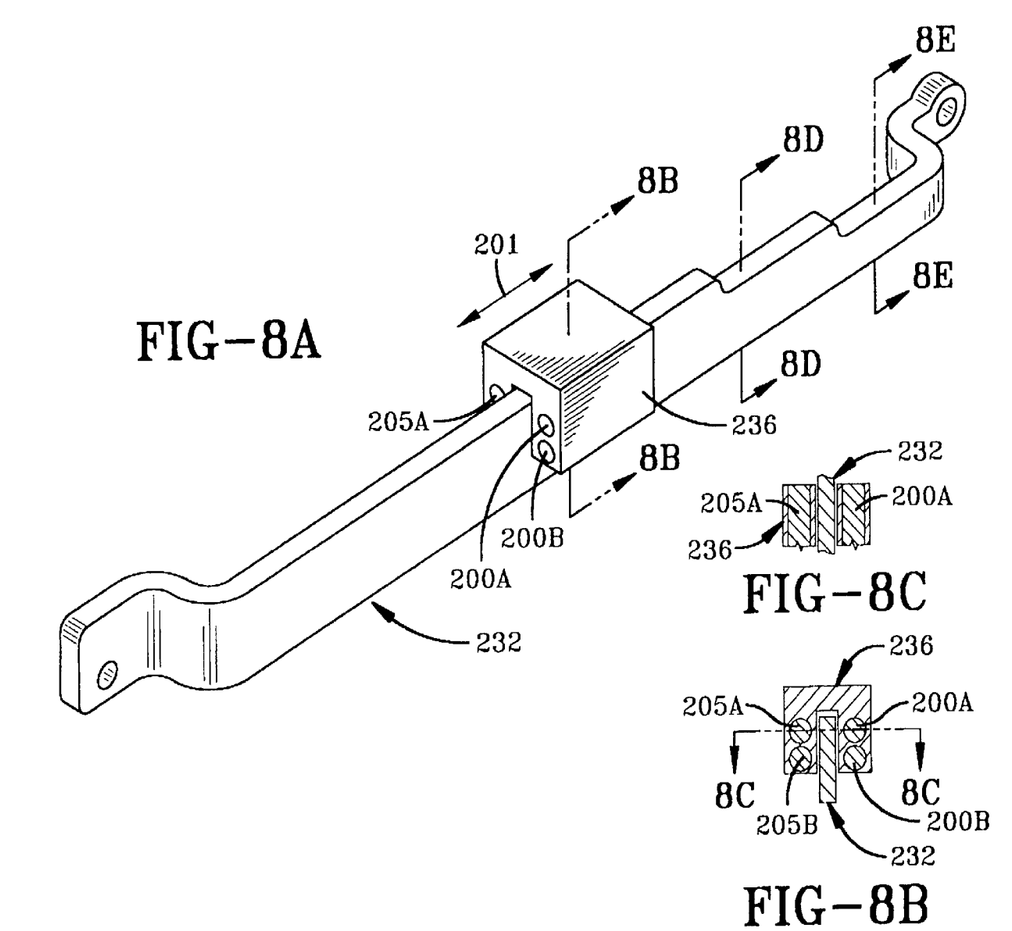
FIGS. 8A, 8B, 8C, 8D and 8E present perspective and cross-sectional views of a vehicle seat position sensor device according to a second preferred embodiment of the present invention.

FIGS. 8A, 8B, 8C, 8D and 8E. present perspective and cross-sectional views of a vehicle seat position sensor device according to a second preferred embodiment of the present invention. The embodiment shown in FIGS. 8A to 8E is similar to that shown in FIGS. 7A to 7D with two notable exceptions. The U shaped housing 232 of this embodiment has two magnetic actuators 205A, 205B located in one leg of the housing and two reed switches 200A–200B located in the other leg of the housing. Furthermore, the elongated member 232 has three zones of varying heights along its length. The U shaped housing and the elongate member can move relative to one another in the direction indicated by arrow 201 in FIG. 8A and is interposed between the magnetic actuators 205A, 205B and the reed switches 200A, 200B. As shown in cross-section in FIG. 8B, when the U shaped housing and elongated member are located relative to one another in a first zone of the length of the elongate member, as shown at section line 8B—8B, the reed switches are not responsive to the substantially blocked electromagnetic force so that a first signal is sent to the controller. FIG. 8C is similar to FIG. 7B and shows the relative locations of the various components in section along line 8C—8C of FIG. 8B.

Figure 8D:
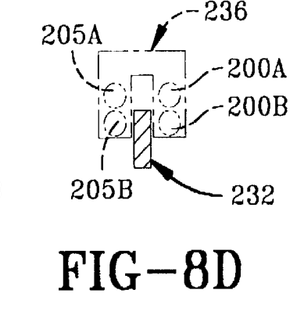

As shown in cross-section in FIG. 8D, when the U shaped housing and elongate member are located relative to one another in a second zone of the length of the elongated member, as shown at section line 8D—8D, only one of the reed switches 200A is responsive to one of the magnetic actuators 205A, and a second signal is sent to the controller.

Figure 8E:
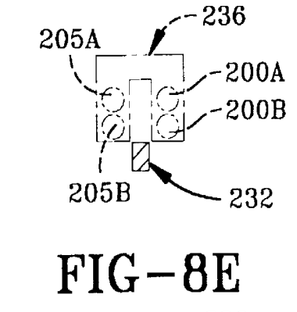

As shown in cross-section in FIG. 8E, when the U shaped housing and elongated member are located relative to one another in a third zone of the length of the elongated member, as shown at section line 8E—8E, each of the reed switches 200A, 200B is responsive to a magnetic actuator 205A, 205B and a third signal is sent to the controller.

Figures 9A, 9B, 9C, 9D:
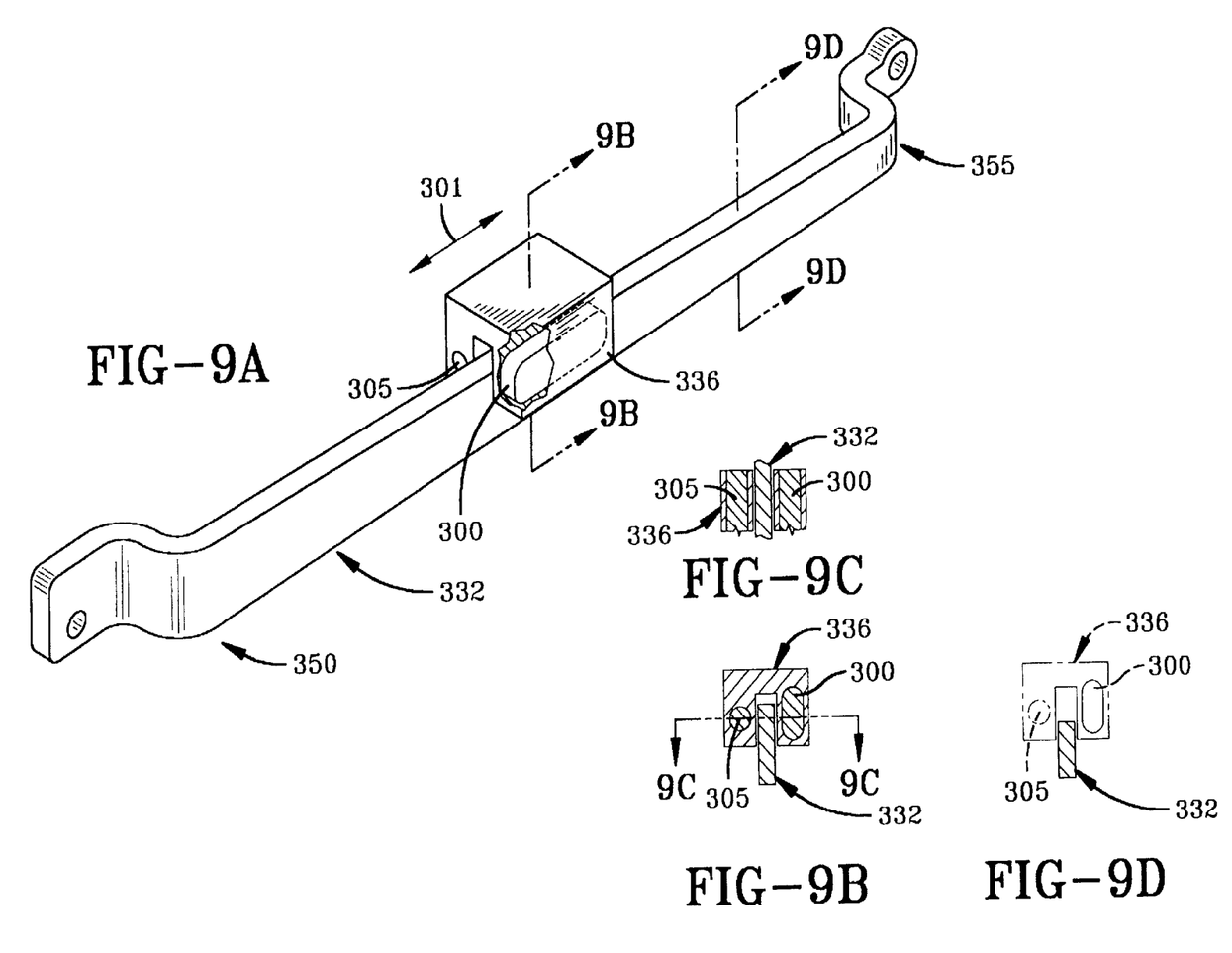
FIGS. 9A, 9B, 9C and 9D present perspective and cross-sectional views of a vehicle seat position sensor device according to a third preferred embodiment of the present invention.

FIGS. 9A, 9B and 9C present perspective and cross-sectional views of a vehicle seat position sensor device according to a third preferred embodiment of the present invention. The embodiment shown in FIGS. 9A–9D is substantially like that shown in FIGS. 7A–7D with two notable exceptions. In this embodiment the height of the elongated member 332 is tapered in a continuous manner from a maximum height at a first end 350 of the elongated member to a minimum height at a second end 355 of the elongated member. A magnetic actuator 305 is situated in one leg of the U shaped housing and a GMR sensor 300 (also known in the art as a Giant Magnetoresistive Sensor) is situated in the other leg of the U shaped sensor. An operating characteristic of a GMR sensor is that the signal emitted by the GMR sensor varies with the degree of exposure to electromagnetic flux. The U shaped housing and the elongated member can move relative to one another in the direction indicated by arrow 302 in FIG. 9A and the elongated member is interposed between the legs of the U shaped member.

When the U shaped housing and the elongated member are disposed relative to one another at different locations along the length of the tapered elongated member, for example at locations indicated by section lines 9B—9B and 9D—9D of FIG. 9A, the degree of exposure of the GMR sensor 305 to the magnetic actuator 305 varies as shown in cross-section in FIGS. 9B and 9D, and the signal sent to the controller varies also. FIG. 9C is a section view taken along line 9C—9C of FIG. 9B showing the disposition of the magnetic actuator 305 and GMR sensor 300 in the U shaped housing 336.

Figure 10:
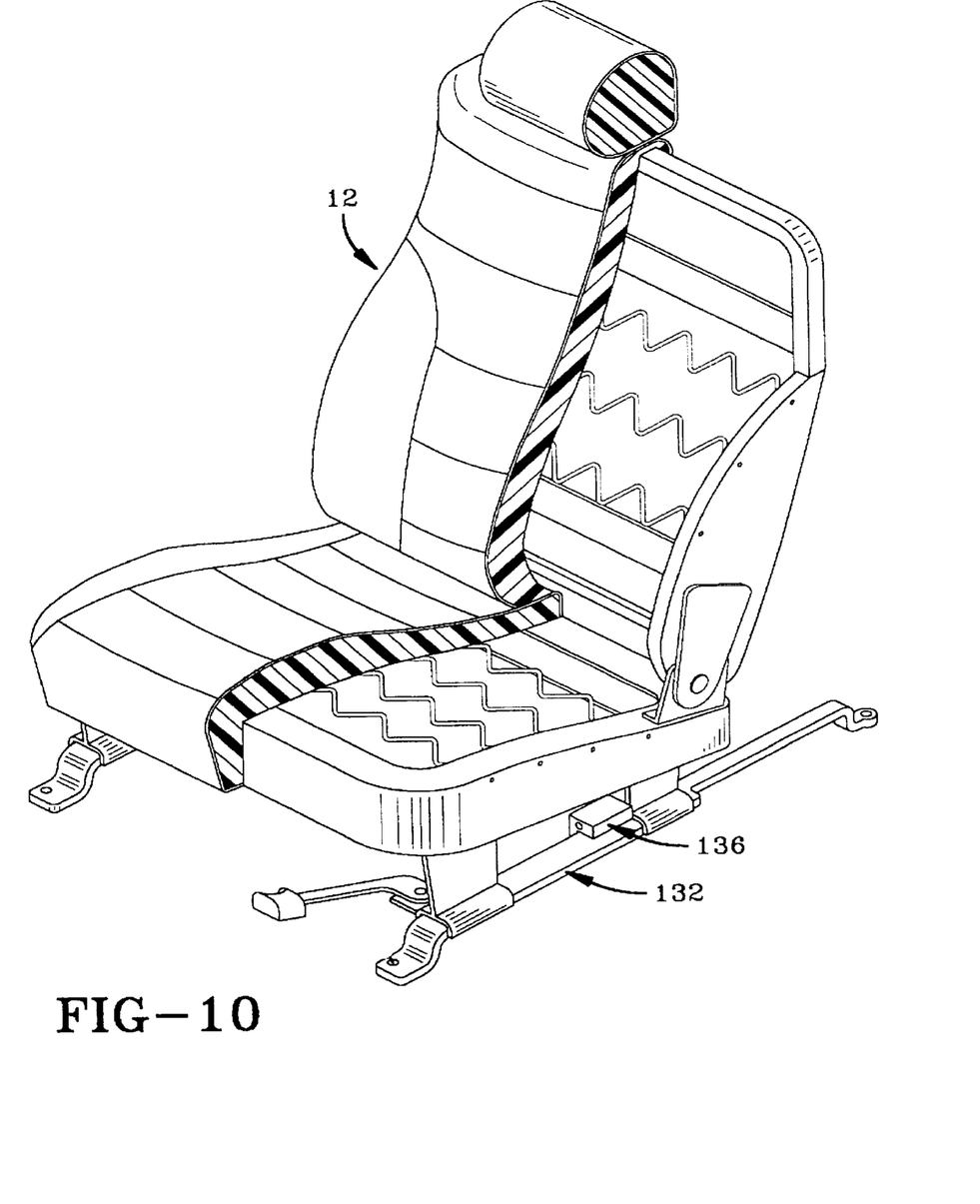
FIG. 10 presents a perspective view, partially broken away, of a vehicle seat equipped with a seat position sensor device of FIGS. 7A, 7B and 7C in a first configuration.

FIG. 10 presents a perspective view, partially broken away, of a vehicle seat equipped with a seat position sensor device of FIGS. 7A, 7B and 7C in a first configuration. In the embodiment shown in FIG. 10 the elongated member 132 is connected to the vehicle floor. The U shaped housing 136 and associated magnetic actuator and reed switch is connected to the vehicle seat 12 such that the U shaped housing moves relative to the elongated member when the position of the seat relative to a selected vehicle components, such as the steering wheel or instrument panel, is changed.

Figure 11:
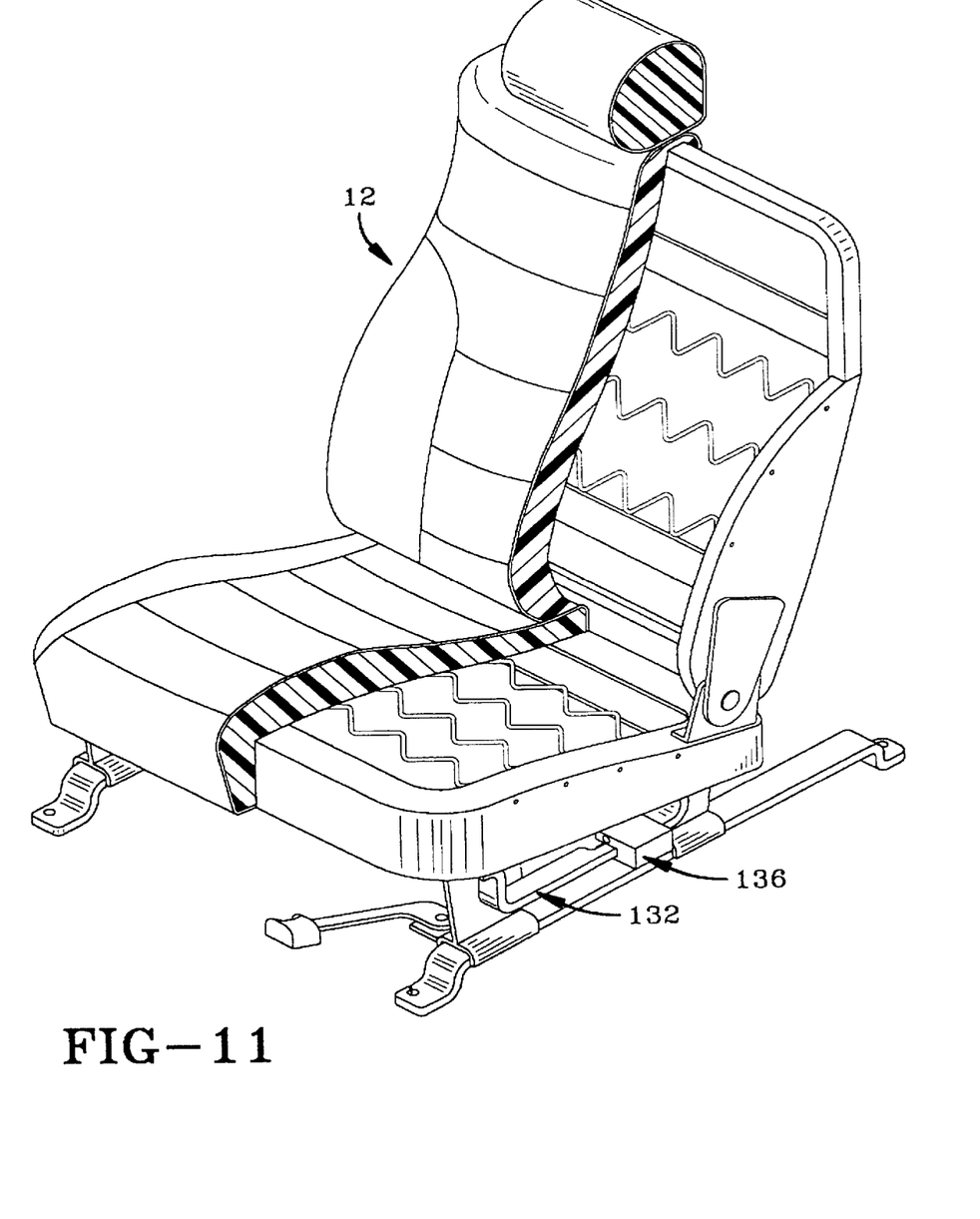
FIG. 11 presents a perspective view, partially broken away, of a vehicle seat equipped with a seat position sensor device of FIGS. 7A, 7B and 7C in a second configuration.

FIG. 11 presents a perspective view, partially broken away, of a vehicle seat equipped with a seat position sensor device of FIGS. 7A, 7B and 7C in a second configuration. In the embodiment shown in FIG. 11 the elongated member 132 is connected to a first portion of the vehicle seat 12 such that the elongated member moves with the seat. However, in this embodiment the U shaped housing 136 and associated magnetic actuator and reed switch are connected to another portion of the seat such that the U shaped member remains stationary.

Figure 12:
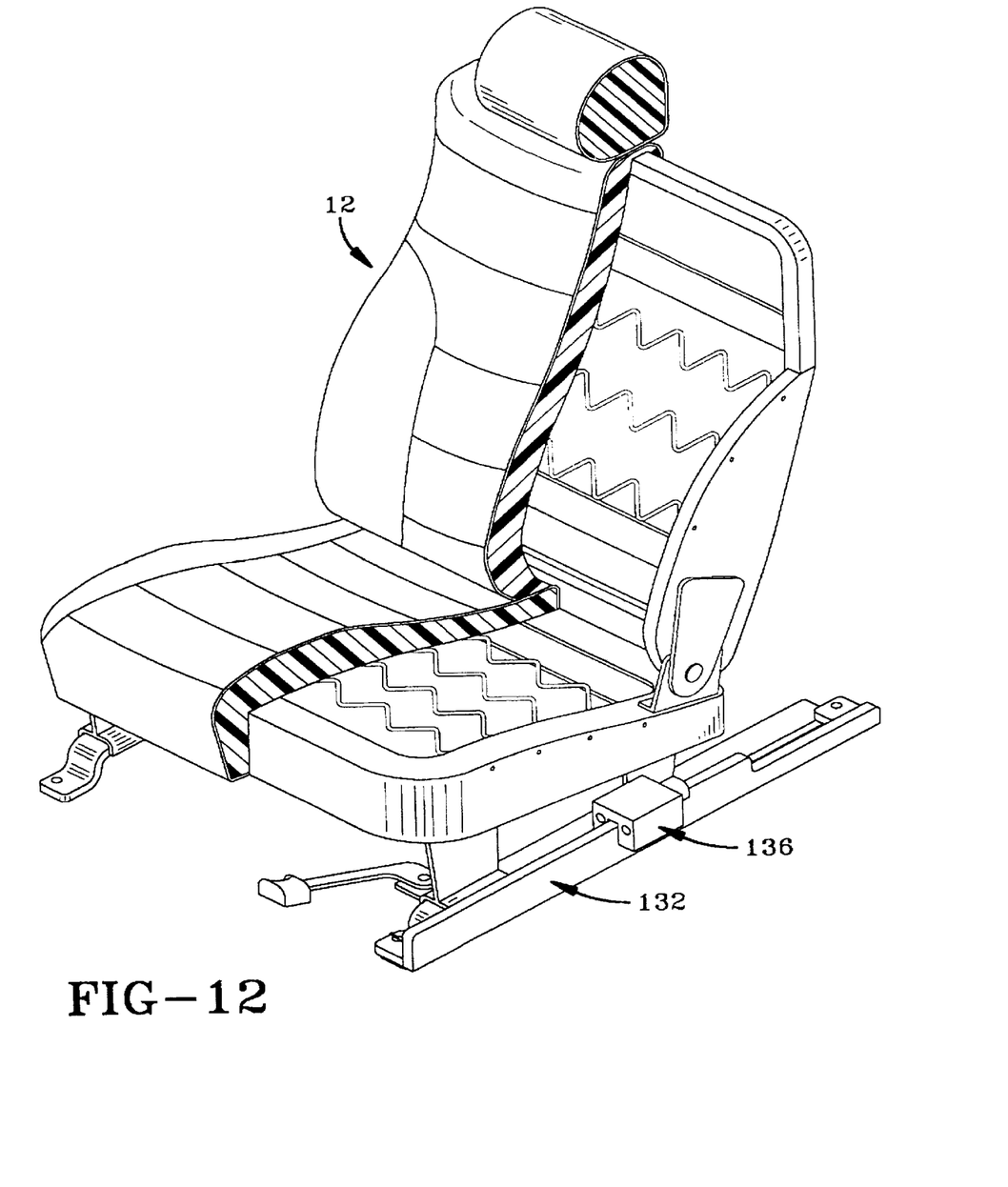
FIG. 12 presents a perspective view, partially broken away, of a vehicle seat equipped with a seat position sensor device of FIGS. 7A, 7B and 7C in a third configuration.

FIG. 12 presents a perspective view, partially broken away, of a vehicle seat equipped with a seat position sensor device of FIGS. 7A, 7B and 7C in a second configuration. In the embodiment shown in FIG. 12 the elongated member 13 is connected to a vehicle or seat component in a manner such that the elongated member remains stationary with the various heights of the elongated member in a vertical orientation. The U shaped housing 136 and associated magnetic actuator and reed switch are connected to the seat such that the U shaped member moves with the seat.

It will thus be seen that certain changes may be made in the above construction without departing from the scope of the invention, and it is intended that all matter contained in the above description or shown in the accompanying drawings shall be interpreted as illustrative and not in a limiting sense.

We claim:

1. A vehicle occupant restraint device system comprising:
    means for detecting a position of a vehicle seat relative to a component of a vehicle, said means being coupled to a vehicle occupant restraint device, said means generating a seat position indicator signal when the distance between the position of said vehicle seat and said vehicle component is in a predetermined range of values; and
    means for controlling the operation of said vehicle occupant restraint device in response to said seat position indicator signal, said controlling means being coupled to said detecting means.

2. The vehicle occupant restraint device system of claim 1, wherein said detecting means further includes a first means coupled to the floor of a vehicle and at least one second means coupled to said vehicle seat, for providing said seat position indicator signal upon cooperation between the first means and said at least one second means.

3. The vehicle occupant restraint device system of claim 2, wherein said seat position indicator signal is generated when the distance between the first means and the at least one second means is greater than a first predetermined value.

4. The vehicle occupant restraint device system of claim 2, wherein said first means comprises a magnetic actuator.

5. The vehicle occupant restraint device system of claim 4, wherein said magnetic element comprises a magnetic strip of material.

6. The vehicle occupant restraint device system of claim 5, wherein said first means is coupled to the floor of said vehicle.

7. The vehicle occupant restraint device system of claim 2, wherein said first means is positioned along a path traversed by said at least one second means.

8. The vehicle occupant restraint device system of claim 2, wherein said at least one second means further comprises a first position indicator sensor.

9. The vehicle occupant restraint device system of claim 8, wherein said first position indicator sensor further comprises a first reed switch.

10. The vehicle occupant restraint device system of claim 9, wherein said first reed switch is coupled to said vehicle seat and is positioned along a path traversed by said vehicle seat.

11. The vehicle occupant restraint device system of claim 2, wherein said at least one second means further comprises a second position indicator sensor.

12. The vehicle occupant restraint device system of claim 8, wherein said second position sensor is located relative to said first position indicator sensor and is positioned along a path traversed by said vehicle seat.

13. The vehicle occupant restraint device system of claim 12, wherein said second position indicator sensor comprises a reed switch.

14. The vehicle occupant restraint device system of claim 9, wherein said reed switch further includes a conductive element response to a magnetic flux enclosed within a housing such that when said reed switch is in cooperative position relative to said first means, said conductive element provides said seat position indicator signal.

15. The vehicle occupant restraint device system of claim 11, wherein said second position indicator sensor generates a second seat position indicator signal based upon the distance between said vehicle seat and said vehicle component is in a second predetermined range of values.

16. The vehicle occupant restraint device system of claim 6, wherein said first means is located along the length of guide means, said guide means coupled to the floor of said vehicle.

17. A vehicle occupant restraint device system compromising:
    a sensor assembly operable to detect position of a vehicle seat relative to a selected component of the vehicle, said sensor assembly generating a seat position indicator signal in response to the distance between said vehicle seat and said selected vehicle component is in a predetermined range of values; and
    a controller operative to control the deployment of said occupant restraint device in response to said seat position indicator signal.

18. The vehicle occupant restraint device system of claim 17, wherein said controlling means further comprises:
    circuitry operative to generate a control signal in response to said seat position indicator signal; and
    an assembly to deploy said occupant restraint device in response to the detection of a predetermined condition and said control signal.

19. The vehicle occupant restraint device system of claim 18, wherein said predetermined condition is the detection of deceleration of a vehicle.

20. The vehicle occupant restraint device system of claim 18, wherein said sensor assembly further includes a magnetic actuator, coupled to the floor of a vehicle and at least one device which is responsive to a magnetic field, coupled to said vehicle seat, said at least one device which is responsive to a magnetic field being operative to provide said seat position indicator signal upon cooperation between said magnetic actuator and said at least one device which is responsive to a magnetic field.

21. The vehicle occupant restraint device system of claim 20, wherein said set position indicator signal is generated when the distance between the magnetic actuator and said at least one device which is responsive to a magnetic field is greater than a first predetermined value.

22. The vehicle occupant restraint device system of claim 20, wherein said at least one device which is responsive to a magnetic field traverses the path traversed by said vehicle seat.

* * * * *